Nov. 9, 1926.  1,606,521
G. FLINTERMANN
BEARING
Filed Nov. 11, 1925  2 Sheets-Sheet 2
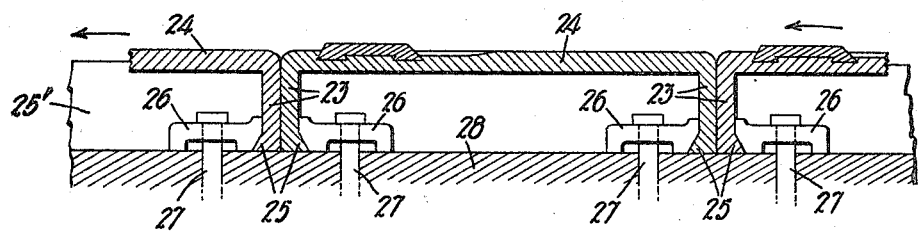
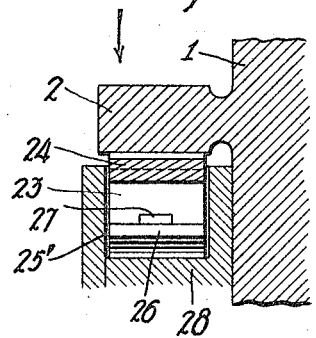
Inventor
Gerhard Flintermann Patented Nov. 9, 1926.

1,606,521

UNITED STATES PATENT OFFICE.

GERHARD FLINTERMANN, OF ORANGE, NEW JERSEY.

BEARING.

Application filed November 11, 1925. Serial No. 68,331.

This invention relates to thrust, journal and other bearings having wedge shaped spaces formed between an abutting rotary element, and a stationary element comprising a plurality of ring sections and this application covers improvements pertaining to bearings including that type of bearing having an axially-split ring supported at intervals and on the top side between supports a projecting friction pad which abuts a rotary member and due to thrust applied, the halves of the elastic ring are deformed causing wedge shaped oil films between the abutting elements.

This invention has as one of its objects simple and effective means of having separately acting independent ring sections so that cut ring sections, each with a projecting pad, are relatively free to move at both of their supported ends which tends to bring about a well defined wedge shaped space between the relatively abutting friction surfaces before the rotary member has started to move; this is due to the combination of axially cut rings being cut into a plurality of independently acting ring sections and the relatively free ends of the ring sections held against the radial joint supports.

A plurality of concentric ring sections may also be used as disclosed in my copending application #34282.

Another object of this invention is to provide means for dividing and interlocking the separate ring sections so that said ring sections are held in place by parts fastening to the main bearing member.

Another object is to have the said dividing and locking means at the same time leave the ends of the ring sections relatively free to move including such cases where the locking means, the supports and the ring sections are integral.

Another object is to provide improved means insuring the entrance of a large amount of lubricant between the relatively abutting elements making a more efficient bearing. A further object is to provide a secondary storage place for the lubricant so that it is immediately available.

Certain additional objects will appear from the following description:

Several embodiments of the invention are illustrated in the accompanying drawings, in which:

Fig. 3 is a section through the improved thrust bearing shown in Fig. 1.

Fig. 4 is a section of an improved journal bearing and has modifications of improvements shown in Figs. 1, 2 and 3.

Fig. 5 is a modification of the method of holding the separate ring sections shown in Fig. 2.

Fig. 6 is a cross section of Fig. 5.

One of the improvements forming the subject matter of this application pertains to having the ring sections each act independently which is accomplished by having separate independent ring sections with their supported ends relatively free to move so that as the weight of the rotary element presses against the projecting pad on the compressible ring section that the ring section is readily depressed due to the two ends being relatively free to move at the points of contact where they are held against the joint supports.

Figure 1:
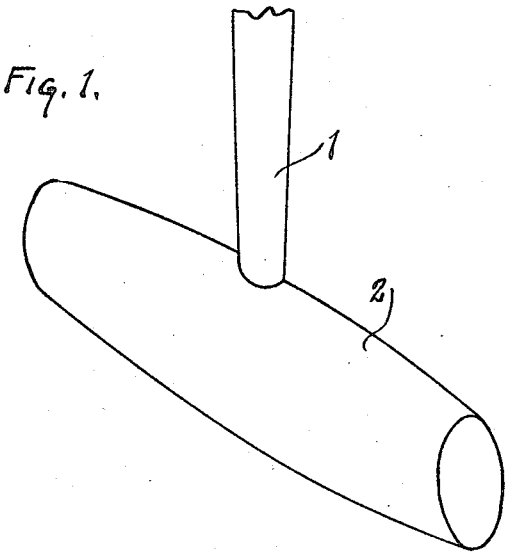
Fig. 1 is a top view of a portion of the stationary member of an improved thrust bearing including a section of the rotary member.
Figure 2:
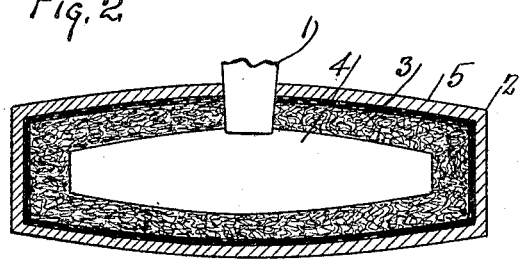
Fig. 2 is a circumferential section through the improved thrust bearing shown in Fig. 1.

Referring to Figs. 1, 2 and 3 a rotary member as a shaft is held against axial movement due to end thrust by means including an annular member 2 fixed on the rotary member 1 and from which end external forces, including the weight of the rotary member, are transmitted through intermediate elements to a stationary member 3. The annular member 2 is preferably integral with a rotary member 1. The arrow on Fig. 3 indicates the direction of the external forces which are transmitted to projecting parts or pads 4 mounted on elastic ring sections 5 which ends are supported on spacers 7 with rounded edges 7' and these in turn rest in groove 6 allowing deflection of ring sections 5. The parts 10 rest in groove 11 having the clearances 12 and the parts 10 are held in groove 11 by bolts 13.

The dovetailed dividers 14 have a number of functions including the interlocking of parts 10 and ring sections 5 by means of the dovetails 9 and the dovetails 9 at the ends of plate 5 prevent the ring sections 5 from raising at their ends 9'; the dividers 14 and 14' also constitute stops for preventing movement of the plates circumferentially of the bearing and are also the means The bearing elements may be held in place, if desired, by any suitable means such as screws, rivets, bolts or the like.

I claim:—

1. A bearing comprising a rotary member, a stationary member, a plurality of separate plates supported by said stationary member, each of said plates being supported at its ends to provide an intervening yielding portion and each plate having a clearance beneath it between the points of support, a bearing projection on each of said plates and means for restraining each end of each plate from moving away from the stationary member but permitting the two ends of each plate to approach each other as the plate yields.

2. A bearing for rotary members comprising a support, a plurality of separate plates mounted on said support, each of said plates being supported at its ends to provide an intervening yielding portion and each plate having a clearance beneath it between the points of support, a bearing projection on each plate, and means for attaching the plates to said support, said means preventing movement of the ends of the plates away from the support but permitting the two ends of each plate to approach each other as the plate yields.

3. A bearing for rotary members comprising a support, a plurality of separate plates mounted on said support, each of said plates being supported at its ends to provide an intervening yielding portion and each plate having a clearance beneath it between the points of support, a bearing projection on each plate, and means for holding the plates to the support said means comprising a member adjacent each end of each plate overlapping the corresponding end of the plate to restrain it from moving away from the support but permitting retraction of the end of the plate as the plate yields.

4. A bearing comprising a rotary member, a stationary member, a plurality of supporting elements secured to said stationary member, a yielding plate supported by each of said supporting elements, each of said plates being supported at its ends by said element to provide an intervening yielding portion having a clearance therebeneath, a bearing projection on each plate, and means associated with said supporting elements and overlapping the ends of the plates to restrain them from moving away from the supporting elements but permitting freedom of movement of the ends of the plates as the plates yield.

5. A bearing comprising a rotary member, a stationary member, a plurality of separate plates supported by said stationary member, each of said plates being supported at its ends to provide an intervening yielding portion and each plate having a clearance beneath it between the points of support, a bearing projection on each of said plates, and means for holding said plates on the stationary member, said means permitting longitudinal retractile movement of at least one end of each plate to permit the plate to yield.

6. A bearing comprising a moving member, a stationary member, a plurality of separate yielding plates, means rigidly associated with the stationary member for supporting the plates at their ends so that each plate has an intervening yielding portion, a bearing projection on the intervening yielding portion of each plate, adapted to abut against the surface of the moving member, and means rigidly associated with said first named means and interposed between the adjoining ends of each pair of plates for preventing movement of the plates circumferentially of the bearing.

7. A bearing comprising a moving member, a stationary member, a plurality of separate yielding plates, means rigidly associated with the stationary member for supporting the plates at their ends so that each plate has an intervening yielding portion, a bearing projection on the intervening yielding portion of each plate adapted to abut against the surface of the moving member, and means at each end of each plate for preventing movement of each plate with respect to the supporting means circumferentially of the bearing comprising a stop rigidly associated with one of them and engaging with the other.

GERHARD FLINTERMANN.

Nov. 9, 1926.

A. L. FREEDLANDER ET AL 1,606,522

POLO MALLET HEAD

Original Filed Dec. 26, 1922

INVENTORS
ABRAHAM L. FREEDLANDER,
WILLIAM G. GOODWIN,
BY Toulmin & Toulmin,
ATTORNEYS